United States Patent [19]

Prince et al.

[11] Patent Number: 5,235,662
[45] Date of Patent: Aug. 10, 1993

[54] METHOD TO REDUCE LIGHT PROPAGATION LOSSES IN OPTICAL GLASSES AND OPTICAL WAVEGUIDE FABRICATED BY SAME

[75] Inventors: Eric T. Prince, Fairport; Sebastian F. Prospero, Byron; Mark M. Romach, Rochester, all of N.Y.

[73] Assignee: Eastman Kodak Company, Rochester, N.Y.

[21] Appl. No.: 815,779

[22] Filed: Jan. 2, 1992

[51] Int. Cl.$^5$ .......... G02B 6/00; C03B 25/00; C03C 3/00
[52] U.S. Cl. .......... 385/129; 385/141; 385/142; 385/14; 65/41; 65/17; 501/11; 501/94; 501/100; 501/153; 501/154; 501/900
[58] Field of Search .......... 385/127, 128, 129, 130, 385/131, 132, 14, 141–147; 65/2, 3.11, 12, 17, 41, 66, 69; 501/11, 27, 37, 49, 53, 63, 94, 95, 100, 127, 133, 153, 154, 900; 437/51

[56] References Cited

U.S. PATENT DOCUMENTS

| | | | |
|---|---|---|---|
| 3,957,342 | 5/1976 | Newns et al. | 385/141 X |
| 4,011,006 | 3/1977 | Fleming, Jr. et al. | 385/142 X |
| 4,183,617 | 1/1980 | Isaacs et al. | 385/130 X |
| 4,284,663 | 8/1981 | Carruthers et al. | 385/130 X |
| 4,339,173 | 7/1982 | Aggarwal et al. | 385/124 X |
| 4,396,409 | 8/1983 | Bailey et al. | 65/3.11 |
| 4,521,443 | 6/1985 | Naik et al. | 427/38 |
| 4,679,892 | 7/1987 | Haisma et al. | 385/141 X |
| 4,938,836 | 7/1990 | Carenco et al. | 385/141 X |
| 4,953,933 | 9/1990 | Asmar | 385/130 X |
| 5,148,510 | 9/1992 | Borrelli et al. | 385/142 |

FOREIGN PATENT DOCUMENTS 62-189407  2/1986  Japan .............. 385/129 X

OTHER PUBLICATIONS

Leavitt, Sandra, Semiconductor International, Mar. 1987, pp. 64–70.
Boyd & Thompson, Glass, vol. II, 3rd Ed., J. Wiley and Sons, Inc. (1980) at pp. 820–835.
Topics in Applied Physics, vol. 7, pp. 218–220, Integrated Optics, T. Tamir, Springer Verlang, N.Y. (1985).
S. Dutta et al; Opt. Eng. 22(1), 117 (1983).
See, S. M., VLSI Technology, 2nd Ed., McGraw-Hill, New York (1988) pp. 359–362.

Primary Examiner—Brian Healy
Attorney, Agent, or Firm—Doreen M. Wells

[57] ABSTRACT

The present invention provides a method of annealing optical glass layers, said method comprising the step of heating glass layers having an area greater than 0.01 cm$^2$ to a temperature of between about 350 deg. C. and 1000 deg. C. in less than 10 minutes. The upper limit of the glass area that can be treated is limited only by the size of the quartz chamber. Current state-of-the-art chambers can accomodate glass areas of about 0.01 cm$^2$ to about 324 cm$^2$. According to another aspect of the invention, there is also provided an optical waveguide glass layer, treated according to the method of this invention, disposed on an integrated optical device.

11 Claims, 4 Drawing Sheets

METHOD TO REDUCE LIGHT PROPAGATION LOSSES IN OPTICAL GLASSES AND OPTICAL WAVEGUIDE FABRICATED BY SAME

BACKGROUND OF THE INVENTION

1. Field of the Invention

The present invention relates to optical glasses such as waveguide glasses.

2. Discussion of the Related Art

Light propagation losses are a major concern in the art of making optical waveguides and other optical devices. When propagating light through optical glass layers over relatively large distances across substrate surfaces, light is generally lost through scattering and by absorption. Scattering occurs at defects and interfaces when the dimension of inhomogeneities is on the order of the wavelength of the propagated light. Absorption occurs in otherwise nonabsorbing media through the formation of non-stoichiometric compounds during the layer forming process.

It is desirable to reduce light propagation losses in optical glass layers such as waveguides for several reasons. With lower scattering and absorption losses there is a lower requirement for source power. Further, because light propagation losses degrade the dynamic range in integrated optical signal processing devices, improved performance would be achieved in these devices if losses were reduced. Such improved devices would then be more competitive than they now are with devices that use other methods of signal processing.

Optical materials that are used for making glass waveguides, for example, should attenuate light less than 1 dB/cm when prepared as a waveguide layer. Unfortunately, due to difficulties encountered in processing these materials into waveguide layers, this low level of attenuation is not often achieved.

There are known methods of reducing light propagation loss in glass waveguides. For example, S. Dutta, H. E. Jackson and J. T. Boyd, Opt. Eng. 22(1), 117 (1983) report considerable success in using the technique of laser annealing to reduce scattering in a variety of thin-film optical waveguides deposited onto thermally oxidized silicon substrates. Dutta et al. used Corning 7059, a baria borosilicate type glass that is much used in the art.

Laser annealing induces local heating of a selected target area on the glass surface, in contrast to furnace annealing in which the entire glass and its substrate are uniformly heated. The spot size of the localized areas heated in laser annealing depends on the power of the laser and the wavelength of the light, but is generally about 0.01 cm$^2$ or less. Local heating has the advantage that the glass can reach temperatures close to its melting point while the temperature of the substrate remains much lower. Further, once the source of the heat is removed, cooling of the glass is more rapid in laser annealing than in furnace annealing.

The problem is that while laser annealing offers advantages by annealing only localized areas, it is not a practical method for treating large areas of glass (typically greater than 0.01 cm$^2$ to about 324 cm$^2$) as is sometimes necessary for the production processing of devices. Such devices include integrated optical read/write heads, beam deflectors, interferometers such as the Mach-Zender interferometer, waveguide modulators, page scanners, and radio frequency spectrum scanners.

SUMMARY OF THE INVENTION

The present invention provides a method of annealing optical glass layers, said method comprising the step of heating glass layers having an area greater than 0.01 cm$^2$ to a temperature of between about 350° C. and 1000° C. in less than 10 minutes. The upper limit of the glass area that can be treated is limited only by the size of the quartz chamber. Current state-of-the-art chambers can accommodate glass areas of about 0.01 cm$^2$ to about 324 cm$^2$.

We have found that rapid thermal processing (RTP) offers the benefits of laser annealing for reduction of light propagation loss plus the ability to treat large areas of glass at one time as does furnace annealing. Being a rapid process technique, there is less likelihood of permanent changes in the physical, electrical or chemical properties of the glasses or their substrates. Although RTP is a known technique, we are aware of no reference which teaches its use with optical glasses, such as waveguides, to obtain the results obtained in this invention.

According to another aspect of the invention, there is also provided an optical glass layer, treated according to the method of this invention, disposed on an integrated optical device or as a protective or antireflective layer on a coated optical device.

DETAILS OF THE INVENTION

An RTP system, also interchangeably referred to as an RTA (rapid thermal annealer), is essentially an isothermal annealing system characterized by an intense radiation source coupled to a thermally isolated silicon wafer. It achieves, within seconds, annealing temperatures of up to 1400° C. RTP performs in seconds what takes tens of minutes in a tube furnace. A typical temperature-time range for isothermal annealing processes by RTP falls approximately within 400°–1400° C. for 1–60 seconds.

RTP and a typical RTP chamber are described and demonstrated by Leavitt, Sandra, *Semiconductor International*, March 1987, at p. 67. The description therein is incorporated herein by reference. Briefly, samples to be heated are mounted in a quartz chamber on a low thermal-mass holder comprising a Si wafer supported at 3–4 points on its circumference by quartz pins. The samples are heated by one or two banks of tungsten-halogen lamps mounted external to the quartz chamber, one bank above and one bank below the wafer. The walls of the quartz chamber may or may not be cooled. A thermocouple embedded in the support wafer is used to indicate sample temperature but optionally, a non-contact pyrometer may be utilized for monitoring the temperature. The Si support wafer and the samples placed upon it are heated by absorbing radiation emitted from the lamps. The environment in the quartz chamber is controlled by replacing the air therein with a selected gas such as oxygen. Other suitable gases include argon and nitrogen. After achieving the desired temperature vs. time profile, the sample is removed and allowed to cool.

Figure 3:
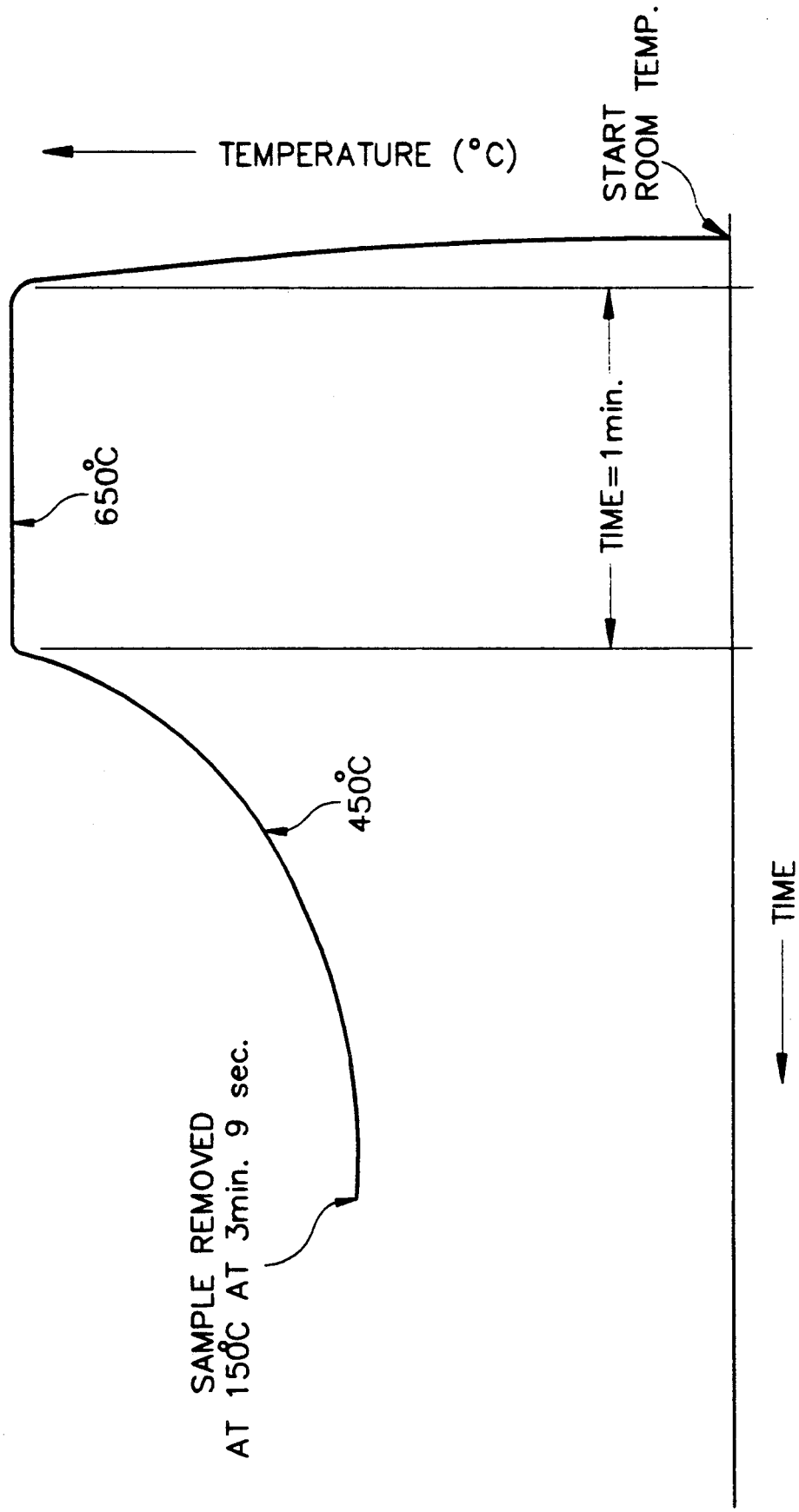
FIG. 3 is a graph showing the temperature vs. time profile for a Corning 7059 glass annealed at 650° C. according to the process of the invention.
Figure 4:
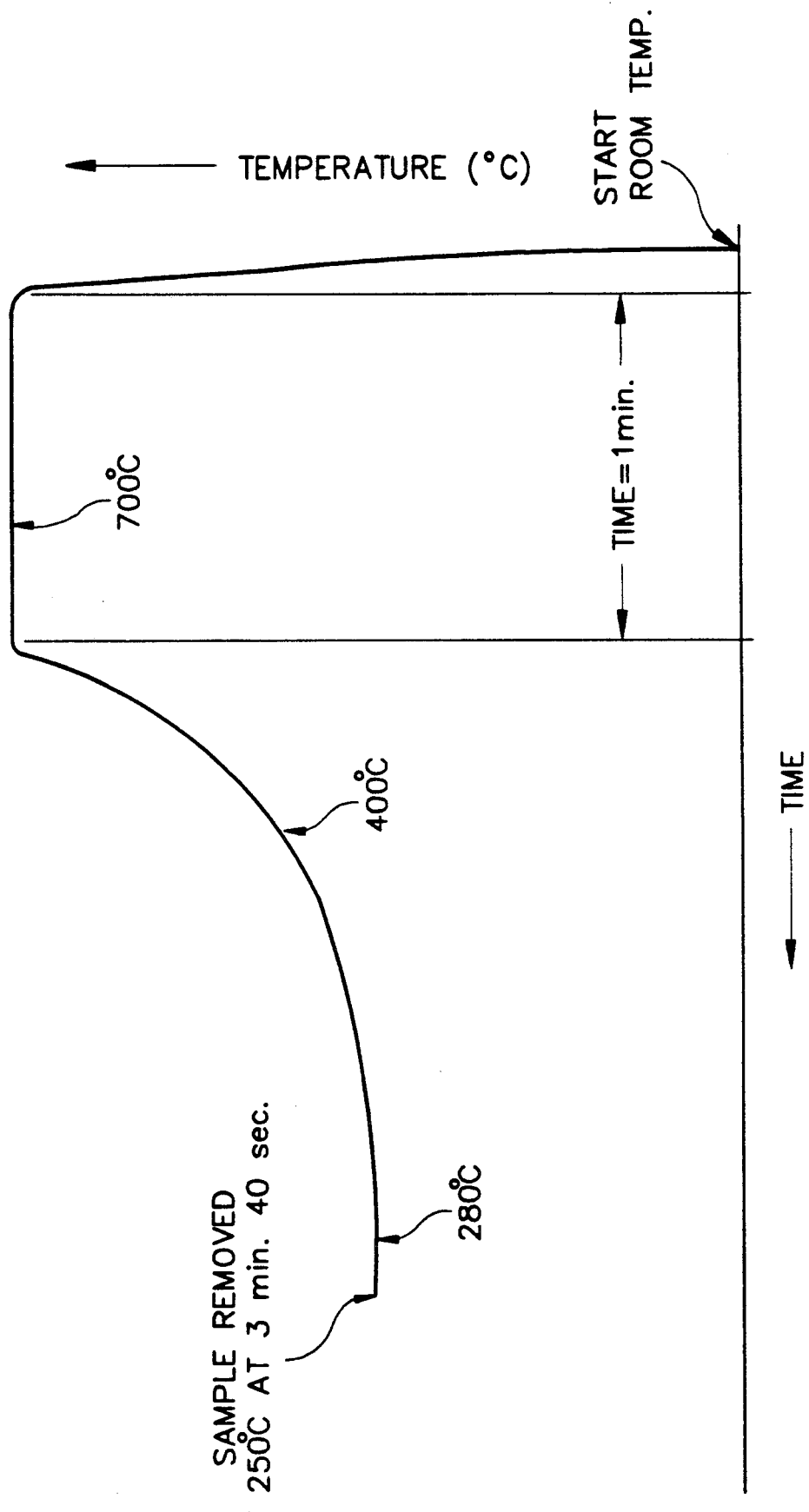
FIG. 4 is a graph showing the temperature vs. time profile for a BK7 glass annealed at 700° C. according to the process of the invention.

The annealing method of the invention may be practised for any glass. For any particular glass to be annealed, it is necessary to heat the glass to high temperatures for an appropriate time. The temperature and time will vary according to the particular glass to be annealed. For example, optimum reduction in light propagation loss was observed in Corning 7057 and BK7 (compositions defined below) by processing these glasses according to the invention at about 650° C. and about 700° C. respectively for about 1 minute. The effective temperature vs. time profile for Corning 7057 and BK7 glasses are shown in FIGS. 3 and 4, respectively.

In determining the appropriate temperature vs. time profile, it is necessary to consider the viscosity of the particular glass to be treated. The viscosity of a glass determines the annealing temperatures and procedures as well as the limitations of its use at high temperatures. See Boyd and Thompson, *Glass*, vol. II, third edition, John Wiley and Sons, Inc., (1980) at p. 825. The factors most frequently considered with respect to viscosity are the working, softening, and annealing points of the particular glass. Definitions of these selected points are given by the American Society for Testing Materials (ASTM) as follows.

The working point of a glass is the temperature at which its viscosity is exactly 1 kPa.s ($10^4$p) as measured in ASTM C336 and C598. At this viscosity, glass is sufficiently fluid for forming by most common methods. The softening point as defined by ASTM C 338 is the temperature at which a uniform fiber of glass 0.55–0.75 mm diameter and 23.5 cm long elongates under its own weight at 1 mm/min when the upper 10 cm is heated at 5° C./min. For glass having a density of 2.50 g/cm$^3$ (C7059=2.76 g/cm$^3$; BK7=2.53 g/cm$^3$) this corresponds to a viscosity of $10^{6.6}$ Pa.s ($10^{7.6}$ poises). The exact viscosity of a glass is a function of its density and surface tension. The annealing point is the temperature that corresponds to a viscosity of approximately $10^{12}$ Pa.s($10^{7.6P}$) (ASTM C 336 and C 598). Temperatures corresponding to these reference points for various glasses appear at pp. 830–831, Boyd and Thompson, supra.

The softening point of C7059 is about 844° C. and the annealing point about 639° C. Significant reduction in light propagation loss was observed at 650° C. The softening point of BK7 is about 715° C. and the annealing point about 624° C. Optimum light propagation loss was observed at 700° C. From such data collected during experimentation, we have found that the optimum temperatures for RTP annealing for the purposes of this invention are near or above the annealing points of the glasses, that is, between the annealing and softening points. We believe that temperatures near the working point would be undesirable as the glasses are then sufficiently non-viscous to flow under the influence of surface tension, gravity, etc.

Since RTP is optimum near or above the annealing point but below the softening point, the corresponding temperatures which bring glasses to these points are the temperatures suggested for annealing optical glass layers. According to Boyd and Thompson, supra, these temperatures range between about 350° C. and 1000° C. For the purposes of this invention, the useful temperature vs. time is between about 350° C. and 1000° C. for less than 10 minutes, but more commonly between about 500° C. to 1000° C. for between about 0.5 and 2 minutes. In the examples below the range was between about 600° C. and about 900° C. for between about 2 seconds and 1 minute.

Current state-of-the-art RTP systems incorporate cold wall chambers which permit high temperatures to be maintained for minutes, and then reduced at programmed rates over short periods of time (about 10 seconds to a few minutes). Even when the walls of the quartz chamber are not cooled, RTP still permits relatively rapid cooling because it offers controls not found in conventional tube furnaces. For example, the flow rate of gas through the chamber, the thermal mass of the sample and support, and the temperature of the chamber walls at the end of a heat cycle all contribute to the rate at which the samples cool. By adjusting the environment within the quartz chamber, it is possible to achieve a faster rate of cooling than that obtained with the furnace method.

Some glass compositions that have previously been found to be unsuitable for high heat processes due to their tendency to devitrify at elevated temperatures, can be processed using the present method. Devitrification is the uncontrolled formation of crystals in a glass during melting, forming, or secondary processing which can adversely affect optical properties, mechanical strength, and even chemical durability. Crystallites within the glass nucleate and grow homogeneously (within the glass) or heterogeneously (at interfaces, i.e. at the air-glass or substrate-glass interface). Glasses which have the greatest tendency to devitrify are those whose temperatures for maximum nucleation rate and maximum growth rate nearly coincide. When glasses of this type are held too long near or are cooled too slowly past these temperatures they begin to crystallize. Significant light propagation losses will occur due to scattering when the dimension of the crystallites approach or exceed the wavelength of light. Unlike conventional furnace systems of high thermal mass whose temperatures cannot be changed rapidly, RTP can heat and cool samples at a rapid rate through these critical regions. Thus, it is expected that RTP will prove useful in reducing light propagation losses in such glasses whose compositions were found previously unsuitable for other heating processes.

The nonlimiting examples below demonstrate and further describe the present invention.

EXAMPLE 1

Planar waveguides of Corning 7059 glass were deposited onto silicon substrates by radio frequency (rf) sputtering from a Corning 7059 glass target. Other useful materials include pyrex and fused quartz. Any substrate which can withstand the required annealing temperatures without being changed in chemical physical properties can be used. The process is carried out at an rf power density of 1.54 watts/cm$^2$ using a gas mixture of oxygen and argon in a 1:4 proportion of $O_2$ to argon at a pressure of 5 mTorr. Light propagation losses in as-deposited waveguide layers depend on the thickness of the waveguide layers, but range typically between 2 and 8 dB/cm at 633 nm. In this example, the glass waveguide was 1.93 microns thick, deposited on a silicon substrate with a 3.0 micron-thick buffer layer Of $SiO_2$ between the substrate and the waveguide. The as-deposited light propagation loss was 7 dB/cm at a wavelength of 633 nm.

Figure 1:
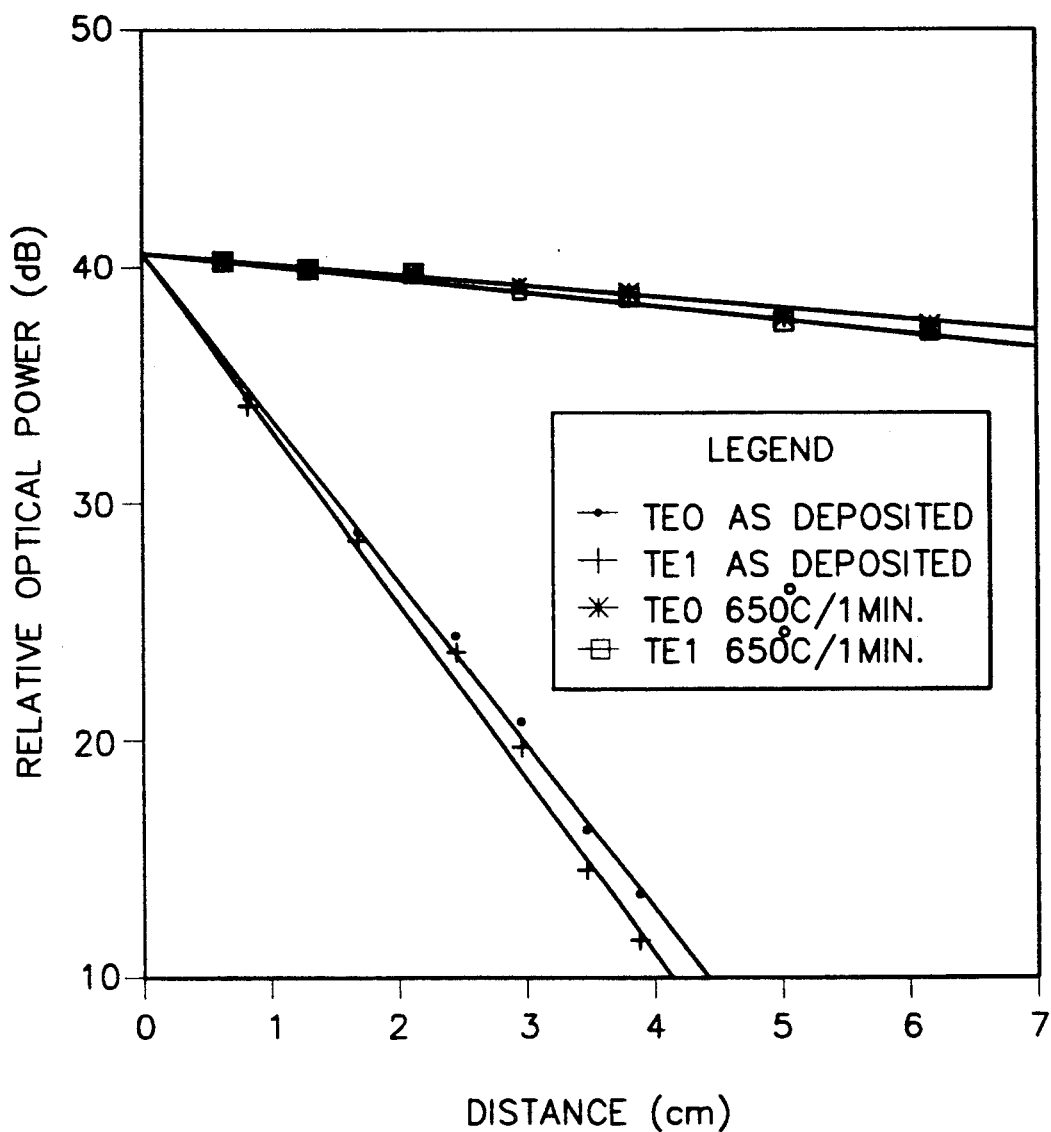
FIG. 1 is a graph showing the light propagation losses in Corning 7059 glass waveguides at a wavelength of 0.633 μm. Light propation losses in the as-deposited and in the annealed glasses are compared.

The sample was then heated by RTP as described above to a temperature of about 650° C. for about 1 minute after which time the heat source was removed. The sample was removed from the quartz chamber about 2 minutes and 9 seconds after the heat source was removed. The walls of the chamber were not cooled. The temperature vs. time profile for this example is shown in FIG. 3. It appears that although the walls of the quartz chambers were not cooled, the heat-rapid quench (cooling) profile shown in FIG. 3 was sufficient to prevent devitrification and successfully reduce light propagation loss. If divitification occurred, light propagation loss would be high. The light propagation loss of the RTP-annealed sample was 0.38 dB as shown in FIG. 1. This represents about a 20-fold decrease in light propagation loss.

Corning C7059 has the composition:

| 7059 (wt %) | |
|---|---|
| $SiO_2$ | 49% |
| $Al_2O_3$ | 10% |
| $B_2O_3$ | 15% |
| BaO | 25% |
| $As_2O_3$ | 1% |

EXAMPLE 2

Example 2 was carried out as described for example I except that BK7, a borosilicate crown, was used instead of Corning 7059. A 1.3-micron thick Bk7 glass layer was sputtered at a power density of 1.54 watts/cm², and was heated to 700° C. instead of 650° C. BK7 has the composition:

| BK7 (wt %) | |
|---|---|
| $SiO_2$ | 69.58% |
| $Al_2O_3$ | 0.04% |
| $B_2O_3$ | 9.91% |
| $Na_2O$ | 8.44% |
| $K_2O$ | 8.37% |
| CaO | 0.07% |
| BaO | 2.54% |
| $Fe_2O_3$ | 0.01% |

Figure 2:
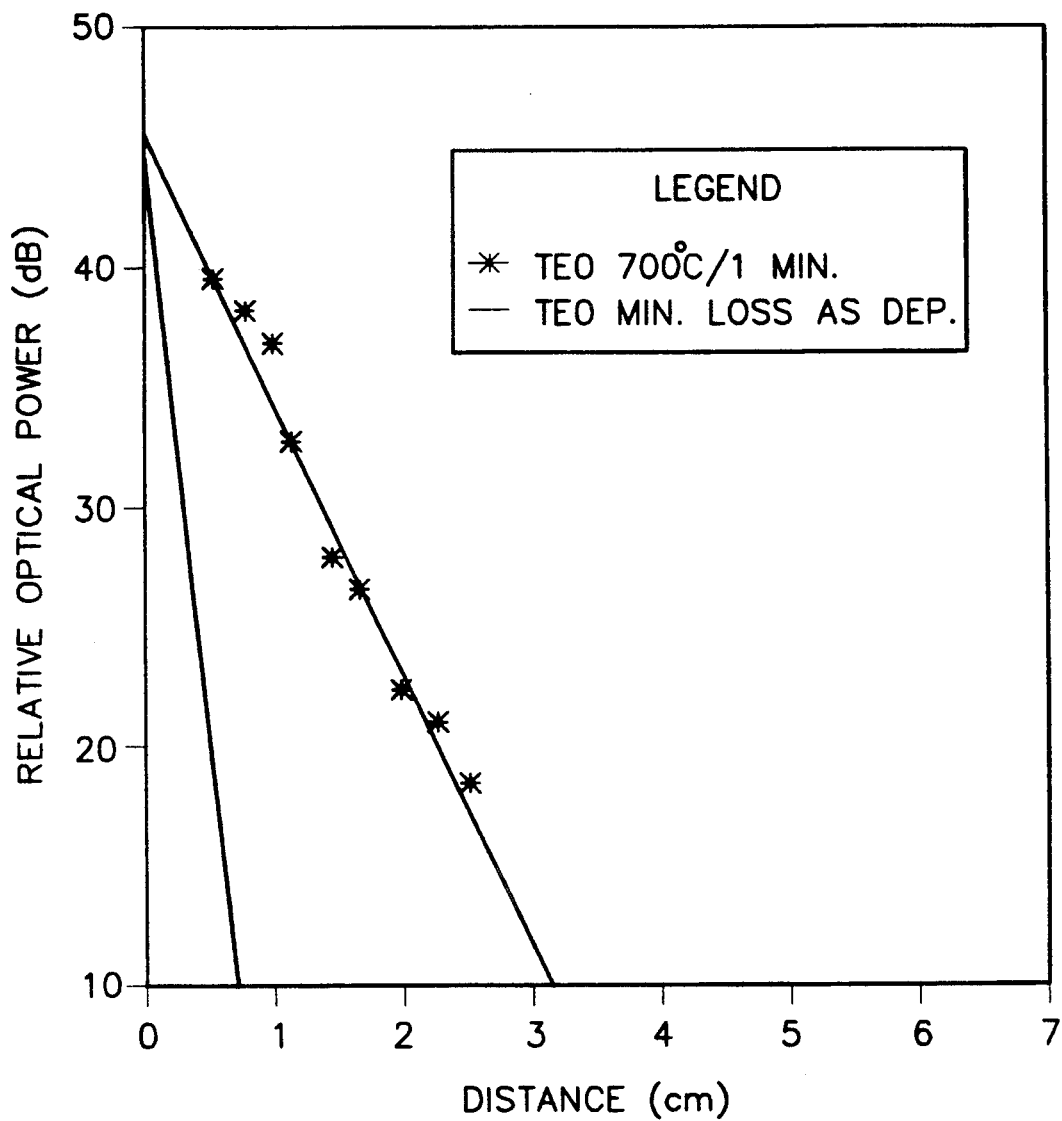
FIG. 2 is a graph showing light propagation losses in BK7 glass waveguides at a wavelength of 0.633 μm. Light propation losses in the as-deposited and in the annealed glasses are compared.

The as-deposited light propagation loss was greater than 54 dB/cm at a wavelength of 633 nm. We could not observe losses greater than 54 dB/cm because under our measurement technique light was not detectable. Loss in the RTF-annealed sample was 11 dB/cm measured at the same wavelength as shown in FIG. 2. BK7 has a loss of 11 dB after RTP annealing at 700° C. Example 2 demonstrates the potential of the invention to significantly reduce light propagation losses in a variety of glasses of different compositions. C7059 is a baria-borosilicate glass whereas BK7 is a borosilicate crown. Since the composition of the two glasses differ so significantly in composition, we can anticipate that RTP will be useful to reduce light propagation losses over a wide range of glass compositions.

Methods of measuring light propagation loss are known in the art. The method used to measure losses in the examples is the two prism technique, described in *Topics in Applied Physics*, vol. 7, at pp. 218–220, *Integrated Optics*, T. Tamir, editor, Springer-Verlag, New York, (1985) and incorporated herein by reference. Briefly, the two prism method uses two clamp-on prisms to couple light into and out of the waveguides. The amount of light transmitted through the waveguides was measured as a function of distance along the waveguides by moving the out-coupling prism toward the in-coupling prism in discrete increments. The out-coupled light was collected with an integrating sphere with an integral detector which measured and registered the light coupled out of the waveguide. The difference between the optical power in-coupled into and out-coupled from the waveguide is the light propagation loss. The loss is expressed as dB per cm.

The invention has been described in detail with particular reference to a preferred embodiment thereof, but it will be understood that variations and modifications can be effected within the spirit and scope of the invention.

We claim:

1. A method of annealing optical glass layers, said method comprising the step of heating glass layers having an area of about $>0.01$ cm²–324 cm² to a temperature of between about 350° C. and 1000° C. in less than 10 minutes.

2. The method of claim 1 wherein the glass layer reaches a temperature of between about 500° C. to about 1000° C. in 0.5 to 2 minutes.

3. The method of claim 1 wherein the glass layer reaches a temperature of between about 600° C. to about 900° C. in about 2 seconds to 1 minute.

4. The method of claim 1 or 2 wherein the glass layer is selected from the group consisting of a baria-borosilicate glass and a borosilicate crown.

5. The method of claim 1 wherein the glass layer comprises silicon oxide, aluminum oxide, barium oxide and boron oxide as the principal components.

6. The method of claim 1 wherein the glass layer comprises silicon oxide, boron oxide, sodium oxide, and potassium oxide as the principal components.

7. The method of claim 1 wherein, after heating, the temperature of the glass layer drops to a temperature of between 450° C. and 150° C. in about 25 seconds to 3 minutes.

8. An optical waveguide having a light propagation loss of about 0.01 dB/cm to about 1 dB/cm and prepared by heating glass layers having an area of about 0.01 cm² to about 324 cm² to a temperature of between about 350° C. and 1000° C. in less than 10 minutes.

9. The optical waveguide of claim 8, coated on an optical device.

10. The optical waveguide of claim 8, disposed on an integrated optical device.

11. The optical waveguide of claim 9 or 10, wherein the optical device is selected from the group consisting of an integrated optical read/write head, a beam deflector, an interferometer, a waveguide modulator, a page scanner, and a radio frequency spectrum analyzer.

* * * * *